Oct. 1, 1946.  J. BANNER  2,408,544
TWIST DRILL SHARPENER
Filed Jan. 1, 1945
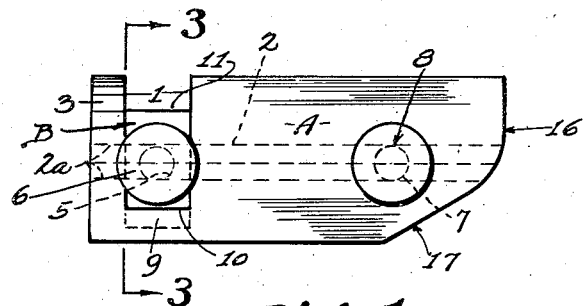
Fig. 1
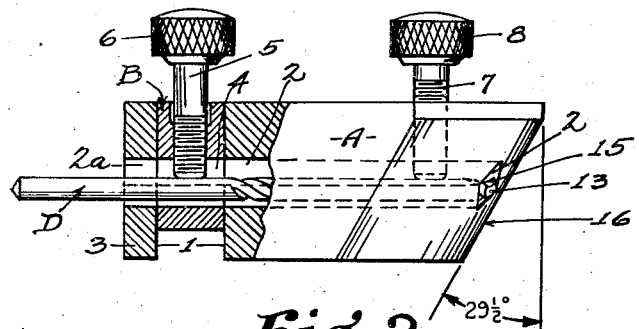
Fig. 2
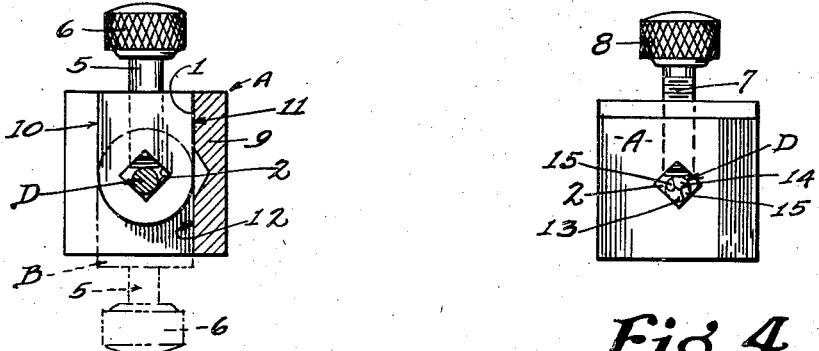
Fig. 3
Fig. 4
JOSEPH BANNER
INVENTOR.
BY *Arthur L. Maas*
attorney Patented Oct. 1, 1946

2,408,544

UNITED STATES PATENT OFFICE 2,408,544

TWIST DRILL SHARPENER

Joseph Banner, Los Angeles, Calif.

Application January 1, 1945, Serial No. 570,933

5 Claims. (Cl. 51—219)

This invention relates to and has for an object the provision of a fixture for honing twist drills, particularly of the smaller sizes, so that the oppositely inclined portions of the drill may be disposed, one after the other, in a plane paralleling with an angular surface of the fixture, and the drill then locked in the fixture in a suitable position for honing the end portions of the drill.

I am aware that fixtures have heretofore been used for supporting drills in position relative to a grinding wheel, but my fixture is designed to support a drill in position whereby the drill end may be honed and sharpened at a requisite angle.

An object is also to provide a fixture with a hole of square or rectangular cross section extending longitudinally therethrough in which a twist drill may be detachably held in one of the angular corners of the hole during a honing operation, said hole being preferably of sufficient area to accommodate a number of drills of different sizes.

A further object is to provide a transverse slot in the fixture body in which a clamp is rotatable to an extent of 180 degrees, so that when a drill is inserted with one of the angular lips thereof extended slightly upwardly of an angular end surface of the body the drill may be set in the clamp and additionally set in the body so that it may not rotate during a honing operation. However, upon completion of a honing operation on one of the angular end lips of the drill, the drill may be loosened in the body so that it may rotate with the clamp to an extent of 180 degrees, and thereby position the other angular lip of the drill relative to the angular end surface of the body. Thus, it will be observed that the two angular end portions of the drill are, one after the other, capable of being honed to an appropriate angle and degree of sharpness by merely rotating the drill in the body, after which the drill is removed from the body and another may be inserted of the same or different size.

I have shown a preferred embodiment of my invention in the accompanying drawing in which:

Fig. 1 is a top plan view;

Fig. 2 is a side elevation partly in section;

Fig. 3 is a sectional elevation on line 3—3 of Fig. 1; and

Fig. 4 is a front end elevation.

As clearly shown in the drawing, the fixture includes a solid body A formed with a transverse slot 1 near the rear end thereof, and a longitudinal hole 2, preferably of square cross section extending through the body and also through the rear end portion 3 of the body, as at 2a. A clamp B is adapted to be adjustably mounted in the slot 1 for rotation to an extent of 180 degrees, and said clamp has a square hole 4 therethrough of the same size, and which registers with the hole 2 in the body A. Thus, as shown in Fig. 2 a drill D may be extended through the holes 2 and 2a of the body and the hole 4 of the clamp B to a desired extent preparatory to a honing operation. It will be noted that clamp B has a set screw 5 threaded thereinto and provided with a knurled head 6 so that drill D may be fixedly held in the clamp. Also body A has a similar set screw 7 with a knurled head 8 near the forward end of the body which is threaded into the body and is adapted to engage drill D. By reference to Fig. 3 it will be seen that the slot 1 is closed only at one side of the body, leaving a wall 9 underlying the clamp B. It will also be noted that clamp B has parallel opposite sides 10 and 11 which are adapted to bear against the inner surface 12 of wall 9 for limiting the rotation of the clamp B on the body to an exact extent of 180 degrees.

In Fig. 3 I have shown the clamp B in full lines in one position and in dotted lines in an adjusted position to an extent of 180 degrees. Now, by reference to Fig. 4 it will be noted that the drill D has angular lips 13 and 14, which are disposed at corresponding angles (29½ degrees) and the usual peripheral flutes 15.

Now, referring to Fig. 2 it will be noted that the forward end 16 of body A is disposed at an angle corresponding to the angle of the lips 13 and 14 of the drill. Also, as shown in Fig. 1, the end surface 16 is tapered backwardly, as at 17, merely for convenience in moving a hone over the drill end.

Now, in operation with a drill D inserted in the fixture, as shown in Fig. 2, one of the lips 14 will be disposed substantially at the same angle as the surface 16 of the body and but very slightly extended therefrom, the drill having previously been locked in clamp B by tightening screw 5, and then locked in body A by tightening screw 7, so that during the honing operation the drill lip is always disposed at a proper angle. Following the sharpening of one of the drill lips screw 7 is loosened and clamp B is turned to an extent of 180 degrees on the body, as indicated by broken lines in Fig. 3, so as to properly position the second drill lip relative to the honing surface 16. Thus, one of the sides 10 or 11 of the clamp B is always engaged with the inner side 12 of wall 9 during the honing operation.

When the drill is properly positioned, as hereinbefore described, one of the cutting edges of the drill is in readiness for sharpening, and the sharpening operation is accomplished by moving an abrasive stone over the front end of the drill D and surface 16 of the body until it conforms to the contour of the front end 16 of the fixture. Similarly, when one lip is sharpened the set screw 7 is released and the clamp B is rotated and the corresponding sharpening of the second drill lip is accomplished. It is apparent that the rotation of the drill in the fixture is accomplished by rotation of the clamp B thereof, and the drill is properly indexed with the honing surface by the adjustment of the clamp B.

Preferably in the use of my improved honing fixture for sharpening drills of sizes from 1 to 80 it is desirable to provide four fixtures of different size corresponding to the difference in diameter of the drills and in length of the drills, and the holes 2 and 2a in the fixture and 4 in the clamp B will be of such size as to accommodate approximately twenty drills of consecutive sizes, as from 80 to 60, 60 to 40, 40 to 20 and 20 to 1. Additional fixtures for drills of a larger size than those mentioned will be correspondingly larger in diameter.

I claim:

1. A drill sharpening fixture comprising: a body formed with a transverse recess and a longitudinal hole extended entirely therethrough and open at opposite ends of the body, a clamping member mounted in the recess of the body and rotatable on the body to an extent of one hundred eighty degrees in a transverse plane and also having a hole therethrough in registration with the hole in the body for receiving and supporting a drill in sharpening position, said clamping member being rotatable on the body about the axis of and with the supported drill, and separate means for locking the clamping member on the drill and the drill on the body so that when a cutting lip of the drill is positioned relative to a surface of said body the drill may be held in a fixed position during a sharpening operation.

2. A drill sharpening fixture comprising: a body formed with a transverse recess and a longitudinal hole extended entirely therethrough and open at opposite ends of the body, a clamping member rotatable in the recess of the body to an extent of one hundred eighty degrees in a transverse plane and also having a hole therethrough in registration with the hole in the body for receiving and supporting a drill in sharpening position, said clamping member being rotatable on the body about the axis of and with the supported drill, and separate means for locking the clamping member on the drill and the drill on the body so that when a cutting lip of the drill is positioned relative to a surface of said body the drill may be held in a fixed position during a sharpening operation, an end of said body being disposed at an acute angle relative to the axis of the drill and in substantial parallelism with a cutting lip of the drill.

3. A drill sharpening fixture comprising: an elongated body having a hole of rectangular cross section longitudinally formed therein and open at both ends of the body for receiving and supporting drills of different diameter in a sharpening operation, an end of said body having a surface disposed at an angle corresponding to that of the cutting lips of a supported drill, said body having a transverse slot therein, a clamping member rotatable in said slot and having a drill receiving hole therein adapted for registration with the hole in the body, means for locking said clamping member to said drill against longitudinal movement of the drill, and means for locking said drill to the body for preventing rotation of the drill and clamping member during a sharpening operation.

4. A drill sharpening fixture comprising: an elongated body having a hole of rectangular cross section longitudinally formed therein and open at both ends of the body for receiving and supporting drills of different diameter in a sharpening operation, an end of said body having a surface disposed at an angle corresponding to that of the cutting lips of a supported drill, said body having a transverse slot therein, a clamping member rotatable in said slot and having a drill receiving hole therein adapted for registration with the hole in the body, means for locking said clamping member to said drill against longitudinal movement of the drill, and means for locking said drill to the body for preventing rotation of the drill and clamping member during a sharpening operation, and means on the body for limiting the rotation of the clamping member to an extent defined by the spacing of the cutting lips on the drill to be sharpened.

5. A drill sharpening fixture comprising: an elongated body having a hole of rectangular cross section longitudinally formed therein and open at both ends of the body for receiving and supporting drills of different diameter in a sharpening operation, an end of said body having a surface disposed at an angle corresponding to that of the cutting lips of a supported drill, said body having a transverse slot therein, a clamping member rotatable in said slot and having a drill receiving hole therein adapted for registration with the hole in the body, means for locking said clamping member to said drill against longitudinal movement of the drill, and means for locking said drill to the body for preventing rotation of the drill and clamping member during a sharpening operation, and means on the body for limiting the rotation of the clamping member to an extent defined by the spacing of the cutting lips on the drill to be sharpened, said clamping member being rotatable about the axis of the supported drill.

JOSEPH BANNER.